(12) United States Patent
Staser et al.

(10) Patent No.: US 12,312,848 B2
(45) Date of Patent: May 27, 2025

(54) WINDOW REGULATOR WITH OPTIMIZED MOTOR CONFIGURATION

(71) Applicant: INTEVA PRODUCTS, LLC, Troy, MI (US)

(72) Inventors: Brian H. Staser, Oxford, MI (US); Lisa Marie Hopman, Oxford, MI (US); Kevin VanDevender, Lapeer, MI (US); Olivia Nowak, Findlay, OH (US)

(73) Assignee: INTEVA PRODUCTS, LLC, Troy, MI (US)

( * ) Notice: Subject to any disclaimer, the term of this patent is extended or adjusted under 35 U.S.C. 154(b) by 53 days.

(21) Appl. No.: 17/514,865

(22) Filed: Oct. 29, 2021

(65) Prior Publication Data

US 2022/0136298 A1 May 5, 2022

Related U.S. Application Data

(60) Provisional application No. 63/107,952, filed on Oct. 30, 2020.

(51) Int. Cl.
*E05F 15/697* (2015.01)
*B60J 1/17* (2006.01)
*E05D 15/16* (2006.01)

(52) U.S. Cl.
CPC ............ *E05D 15/165* (2013.01); *B60J 1/17* (2013.01); *E05F 15/697* (2015.01);
(Continued)

(58) Field of Classification Search
CPC ........... E05Y 2201/434; E05Y 2201/64; E05Y 2201/654; E05Y 2201/668; E05Y 2600/50;
(Continued)

(56) References Cited

U.S. PATENT DOCUMENTS

| 2,987,937 A | * | 6/1961 | Sala | ........................ E05F 11/486 74/505 |
| 4,329,816 A | | 5/1982 | Koike | |

(Continued)

FOREIGN PATENT DOCUMENTS

| DE | 19836705 A1 * | 2/2000 | ............... E05F 15/40 |
| FR | 2832753 A1 * | 5/2003 | ............. E05F 11/486 |

(Continued)

OTHER PUBLICATIONS

International Search Report for International Application No. PCT/US2021/057354; Date of Completion: Feb. 18, 2022; Date of Mailing: Feb. 21, 2022; 3 Pages.

(Continued)

*Primary Examiner* — Jerry E Redman
(74) *Attorney, Agent, or Firm* — CANTOR COLBURN LLP

(57) ABSTRACT

A window regulator for raising and lowering a window of a vehicle, including: a guide rail; a cursor slidably mounted to the guide rail; a flange portion mounted to a bottom end of the guide rail, wherein the flange portion has a rail mounting portion and an arm portion extending from the rail mounting portion and a mounting portion extending from the arm portion; and a motor operably coupled to the cursor such that operation of the motor will cause the cursor to slide along the guide rail, the motor being mounted to the mounting portion, wherein the motor when mounted to the mounting portion is located adjacent to a side of the guide rail located between the bottom end of the guide rail and a top end of the guide rail.

20 Claims, 7 Drawing Sheets

(52) U.S. Cl.
CPC ..... *E05Y 2201/434* (2013.01); *E05Y 2201/64* (2013.01); *E05Y 2201/654* (2013.01); *E05Y 2201/668* (2013.01); *E05Y 2201/684* (2013.01); *E05Y 2900/55* (2013.01)

(58) Field of Classification Search
CPC . E05Y 2800/205; E05F 11/483; E05F 11/486; E05F 11/382
USPC .......................................................... 49/352
See application file for complete search history.

(56) References Cited

U.S. PATENT DOCUMENTS

| | | | |
|---|---|---|---|
| 4,335,541 A * | 6/1982 | Kazewych | E05F 11/426 49/352 |
| 4,420,906 A | 12/1983 | Pickles | |
| 4,502,247 A * | 3/1985 | Kobayashi | E05F 11/483 49/374 |
| 4,575,967 A | 3/1986 | Bickerstaff | |
| 4,700,508 A | 10/1987 | Koellner et al. | |
| 4,744,172 A * | 5/1988 | Miyauchi | E05F 15/689 49/362 |
| 4,819,380 A * | 4/1989 | Trebbi | B60J 1/17 49/440 |
| 4,835,907 A * | 6/1989 | Heuchert | E05F 11/486 49/352 |
| 4,890,376 A | 1/1990 | Boileau | |
| 5,074,077 A * | 12/1991 | Toyoshima | E05F 11/485 49/352 |
| 5,694,717 A | 12/1997 | Gier | |
| 5,832,664 A | 11/1998 | Tajima et al. | |
| 5,924,245 A * | 7/1999 | Manuel | B60J 5/0416 49/502 |
| 5,950,365 A | 9/1999 | Lieb et al. | |
| 5,960,588 A | 10/1999 | Wurm et al. | |
| 5,964,063 A * | 10/1999 | Hisano | E05F 11/488 49/502 |
| 5,970,658 A * | 10/1999 | Smith | E05F 11/382 49/352 |
| 6,354,652 B1 * | 3/2002 | Arquevaux | B60J 5/0416 49/502 |
| 6,516,493 B1 * | 2/2003 | Seliger | E05F 11/486 49/352 |
| 6,536,164 B1 * | 3/2003 | Kirejczyk | B60R 13/02 49/502 |
| 6,688,043 B1 * | 2/2004 | Feder | B21D 39/032 49/502 |
| 6,766,618 B2 | 7/2004 | Cardine et al. | |
| 6,820,370 B2 | 11/2004 | Marscholl | |
| 6,874,279 B1 * | 4/2005 | Weber | E05F 11/488 49/459 |
| 6,910,730 B2 | 6/2005 | Kinoshita et al. | |
| 6,931,791 B1 * | 8/2005 | Pleiss | B60J 5/0416 49/502 |
| 7,047,692 B2 | 5/2006 | Benoit et al. | |
| 7,076,918 B2 * | 7/2006 | Tatsumi | B60J 5/0416 49/374 |
| 7,121,044 B2 * | 10/2006 | Santaolalla Gil | E05F 11/486 49/352 |
| 7,150,493 B2 | 12/2006 | Kinoshita et al. | |
| 7,555,868 B2 * | 7/2009 | Tenorio | E05F 11/382 49/374 |
| 7,617,633 B2 * | 11/2009 | Shimura | E05F 11/382 49/352 |
| 7,793,464 B2 * | 9/2010 | Bucker | E05F 11/382 49/502 |
| 7,797,882 B2 | 9/2010 | Lubaway | |
| 7,877,932 B2 | 2/2011 | Kriese et al. | |
| 7,882,658 B2 * | 2/2011 | Staser | B60J 5/0416 49/352 |
| 8,109,039 B2 * | 2/2012 | Kruger | B60J 5/0416 49/352 |
| 8,671,621 B2 * | 3/2014 | Yoshida | H02K 11/215 49/352 |
| 8,844,198 B2 * | 9/2014 | Raisoni | E05F 11/382 264/328.8 |
| 8,935,886 B2 * | 1/2015 | Pavlovic | B60J 5/0416 49/352 |
| 8,943,665 B2 * | 2/2015 | Walawender | E05F 11/38 29/458 |
| 9,163,448 B2 * | 10/2015 | Imaoka | E05F 15/689 |
| 9,580,953 B1 * | 2/2017 | Matsushita | B60J 1/08 |
| 10,221,608 B2 * | 3/2019 | Fever | E05F 15/689 |
| 10,273,733 B2 | 4/2019 | Huang et al. | |
| 10,309,140 B2 * | 6/2019 | Imaoka | E05D 15/165 |
| 10,669,764 B2 | 6/2020 | Fortin | |
| 10,676,975 B2 * | 6/2020 | Fortin | B60J 5/0433 |
| 10,711,502 B2 * | 7/2020 | Yokoyama | B60J 1/17 |
| 10,829,973 B2 * | 11/2020 | Hazon | E05D 15/165 |
| 11,125,002 B2 * | 9/2021 | Pavlovic | E05F 11/382 |
| 11,162,291 B2 | 11/2021 | Reames et al. | |
| 11,674,348 B2 | 6/2023 | Krieger et al. | |
| 2003/0101654 A1 * | 6/2003 | Dufour | E05F 11/486 49/352 |
| 2003/0106267 A1 | 6/2003 | Dron | |
| 2004/0227376 A1 * | 11/2004 | Kinoshita | B60J 5/101 296/146.6 |
| 2004/0237699 A1 | 12/2004 | Kinoshita et al. | |
| 2006/0143985 A1 * | 7/2006 | Garcia Martin | E05F 11/488 49/352 |
| 2006/0174542 A1 * | 8/2006 | Bernard | E05F 11/485 49/352 |
| 2007/0180773 A1 * | 8/2007 | Fortin | E05F 15/689 49/352 |
| 2007/0193119 A1 * | 8/2007 | Hoffman | E05F 15/619 49/352 |
| 2007/0220811 A1 * | 9/2007 | Flendrig | B60R 13/06 49/352 |
| 2007/0277441 A1 * | 12/2007 | Smith | E05F 11/385 49/211 |
| 2008/0005971 A1 * | 1/2008 | Dickie | E05F 15/689 49/349 |
| 2009/0265993 A1 | 10/2009 | Shah et al. | |
| 2010/0223852 A1 * | 9/2010 | Arimoto | E05F 15/689 24/304 |
| 2011/0047878 A1 * | 3/2011 | Raisoni | E05D 15/165 264/254 |
| 2013/0098183 A1 * | 4/2013 | Fever | E05F 15/689 74/606 R |
| 2013/0219794 A1 * | 8/2013 | Nakamura | E05F 11/426 49/350 |
| 2013/0318876 A1 * | 12/2013 | Takakura | E05F 15/697 49/506 |
| 2014/0237900 A1 * | 8/2014 | Imaoka | F16F 15/22 49/352 |
| 2015/0101252 A1 * | 4/2015 | Baba | E05F 11/486 49/352 |
| 2016/0047411 A1 | 2/2016 | Simonneau et al. | |
| 2017/0268273 A1 | 9/2017 | Matsushita | |
| 2019/0226264 A1 | 7/2019 | Shiroma | |
| 2019/0390757 A1 | 12/2019 | Matsushita | |
| 2020/0157870 A1 * | 5/2020 | Staser | E05F 11/486 |
| 2022/0136298 A1 * | 5/2022 | Staser | E05F 15/697 49/349 |
| 2022/0145687 A1 | 5/2022 | Trautmann et al. | |
| 2022/0186544 A1 | 6/2022 | Krieger et al. | |
| 2022/0213729 A1 * | 7/2022 | Staser | E05F 15/697 |
| 2023/0279713 A1 | 9/2023 | Staser et al. | |

FOREIGN PATENT DOCUMENTS

| | | |
|---|---|---|
| JP | 2015200148 A | 11/2015 |
| JP | 2019138117 A | 8/2019 |

(56) References Cited

FOREIGN PATENT DOCUMENTS

KR        1020110043370 A      4/2011
WO      WO-2022094276 A1 *   5/2022  ............... B60J 1/17

OTHER PUBLICATIONS

Written Opinion for International Application No. PCT/US2021/057354; Date of Completion: Feb. 18, 2022; Date of Mailing: Feb. 21, 2022; 5 Pages.
French Office Action for French Application Number 22/02626 Issued Jun. 2, 2022, 7 Pages, No English Translation.
IPRP Mailed May 11, 23.
Non-Final Office Action, Issued Sep. 12, 2023.
Final Office Action dated Feb. 9, 2024.
Non-Final Office action dated Feb. 12, 2024.
Advisory Action corresponding to U.S. Appl. No. 17/704,383; Mailing Date, Apr. 18, 2024.
French Search Opinion corresponding to FR Application No. 2202626; Issue Date: Jan. 29, 2025, 14 pages.
U.S. Non-Final Office Action corresponding to U.S. Appl. No. 17/704,383; Issue Date, Apr. 14, 2025, 33 pages.

* cited by examiner

WINDOW REGULATOR WITH OPTIMIZED MOTOR CONFIGURATION

CROSS REFERENCE TO RELATED APPLICATIONS

This application claims the benefit of U.S. Provisional Patent Application No. 63/107,952 filed on Oct. 30, 2020, the entire contents of which are incorporated herein by reference thereto.

BACKGROUND

Exemplary embodiments pertain to the art of vehicles, and more particularly to window regulators for vehicles.

Passenger vehicles typically have windows surrounding the passenger compartment. Windows in doors of the vehicle may be designed to be raised and lowered electrically by an operator. The operator may be the driver or a passenger usually using an interior switch. The physical raising and lowering of a window is performed by an electromechanical device referred to as a window regulator. The window regulator is typically located within a vehicle door cavity. The vehicle door cavity has limited available space for such components. As such, it is desired to provide a window regulator that has a smaller profile.

BRIEF DESCRIPTION

Disclosed is a window regulator for raising and lowering a window of a vehicle, including: a guide rail; a cursor slidably mounted to the guide rail; a flange portion mounted to a bottom end of the guide rail, wherein the flange portion has a rail mounting portion and an arm portion extending from the rail mounting portion and a mounting portion extending from the arm portion; and a motor operably coupled to the cursor such that operation of the motor will cause the cursor to slide along the guide rail, the motor being mounted to the mounting portion, wherein the motor when mounted to the mounting portion is located adjacent to a side of the guide rail located between the bottom end of the guide rail and a top end of the guide rail.

In addition to one or more of the features described above, or as an alternative to any of the foregoing embodiments, a cable drum is rotationally mounted to the flange portion, the cable drum being operably coupled to the motor and at least one cable secured to the cable drum at one end and the cursor at another end.

Also disclosed is a window regulator for raising and lowering a window of a vehicle, including: a guide rail; a cursor slidably mounted to the guide rail; a flange portion mounted to a top end of the guide rail, wherein the flange portion has a rail mounting portion and an arm portion extending from the rail mounting portion and a mounting portion extending from the arm portion; and a motor operably coupled to the cursor such that operation of the motor will cause the cursor to slide along the guide rail, the motor being mounted to the mounting portion, wherein the motor when mounted to the mounting portion is located adjacent to a side of the guide rail located between a bottom end of the guide rail and the top end of the guide rail.

In addition to one or more of the features described above, or as an alternative to any of the foregoing embodiments, a lower pulley is rotationally mounted to the rail mounting portion and an upper pulley rotationally secured to secured to the top end of the guide rail by a housing.

In addition to one or more of the features described above, or as an alternative to any of the foregoing embodiments, the guide rail is a three sided structure with an opening and the guide rail is insert molded onto the flange portion the flange portion has a structural member that extends into the opening.

In addition to one or more of the features described above, or as an alternative to any of the foregoing embodiments, the guide rail is an extruded structure that has internal structural features that extend across a cavity of the guide rail.

In addition to one or more of the features described above, or as an alternative to any of the foregoing embodiments, the guide rail has a rectangular periphery and a portion of the cursor completely surrounds the guide rail.

In addition to one or more of the features described above, or as an alternative to any of the foregoing embodiments, the guide rail is hollow.

In addition to one or more of the features described above, or as an alternative to any of the foregoing embodiments, the portion of the cursor surrounding the guide rail has multiple contact points with the guide rail in order to prevent twisting of the cursor as it slides up and down the guide rail.

In addition to one or more of the features described above, or as an alternative to any of the foregoing embodiments, the rail mounting portion, the arm portion extending and the mounting portion are all formed as a single piece.

In addition to one or more of the features described above, or as an alternative to any of the foregoing embodiments, the motor extends in a direction generally parallel to the guide rail.

In addition to one or more of the features described above, or as an alternative to any of the foregoing embodiments, a pair of cables are secured to a cable drum rotationally mounted to the flange portion at one end and the cursor at another end.

In addition to one or more of the features described above, or as an alternative to any of the foregoing embodiments, the flange portion further includes cable guides configured to guide the pair of cables as they are wound and unwound from the cable drum.

In addition to one or more of the features described above, or as an alternative to any of the foregoing embodiments, the arm portion extends laterally and upwardly towards the top end of the guide rail from the bottom end of the guide rail.

Also disclosed is a window regulator for raising and lowering a window of a vehicle, including: a guide rail; a cursor slidably mounted to the guide rail; a flange portion mounted to a bottom end of the guide rail, wherein the flange portion has a rail mounting portion and an arm portion extending from the rail mounting portion and a mounting portion extending from the arm portion; a motor operably coupled to the cursor by at least one cable such that operation of the motor will cause the cursor to slide along the guide rail, the motor being mounted to the mounting portion, wherein the motor when mounted to the mounting portion is located adjacent to a side of the guide rail located between the bottom end of the guide rail and a top end of the guide rail.

In addition to one or more of the features described above, or as an alternative to any of the foregoing embodiments, a lower pulley is rotationally mounted to the rail mounting portion and an upper pulley rotationally secured to secured to the top end of the guide rail by a housing.

In addition to one or more of the features described above, or as an alternative to any of the foregoing embodiments, a cable drum is rotationally mounted to the flange portion, the cable drum being operably coupled to the motor and the at least one cable being wound and unwound from the cable drum as it is rotated by the motor.

In addition to one or more of the features described above, or as an alternative to any of the foregoing embodiments, the guide rail has a rectangular periphery and a portion of the cursor completely surrounds the guide rail.

In addition to one or more of the features described above, or as an alternative to any of the foregoing embodiments, the guide rail is hollow.

In addition to one or more of the features described above, or as an alternative to any of the foregoing embodiments, the portion of the cursor surrounding the guide rail has multiple contact points with the guide rail in order to prevent twisting of the cursor as it slides up and down the guide rail.

Also disclosed is a guide rail for use with a window regulator of a vehicle, including: a three sided structural member having a channel; an exterior plastic material molded about the three sided structural member, the exterior plastic material forms an exterior surface of the guide rail; and a housing formed as single unitary structure with the three sided structure and the exterior plastic material.

In addition to one or more of the features described above, or as an alternative to any of the foregoing embodiments, the housing is configured to have a cable guide.

In addition to one or more of the features described above, or as an alternative to any of the foregoing embodiments, the housing is configured to support a motor and a cable drum.

In addition to one or more of the features described above, or as an alternative to any of the foregoing embodiments, the channel includes a "U" shaped configuration.

In addition to one or more of the features described above, or as an alternative to any of the foregoing embodiments, the channel is formed by a bottom portion and a pair of integrally formed opposing sidewalls of the three sided structural member.

In addition to one or more of the features described above, or as an alternative to any of the foregoing embodiments, the three sided structural member is formed from anyone of the following materials; metal, aluminum, steel, metallic alloys, a plastic material, and a plastic composite material.

In addition to one or more of the features described above, or as an alternative to any of the foregoing embodiments, the exterior plastic material located within the channel has open areas.

In addition to one or more of the features described above, or as an alternative to any of the foregoing embodiments, the housing is located at a top of the guide rail when it is secured to a vehicle door.

In addition to one or more of the features described above, or as an alternative to any of the foregoing embodiments, the housing is located at a bottom of the guide rail when it is secured to a vehicle door.

In addition to one or more of the features described above, or as an alternative to any of the foregoing embodiments, the housing is configured to have a feature that rotationally receives a pulley.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is an apparatus for raising and lowering a window of a vehicle. The apparatus may be referred to as a "window regulator". In one or more embodiments, the window regulator is an electromechanical device that can be controlled by a user inside the vehicle such as by operating a switch.

Figure 1:
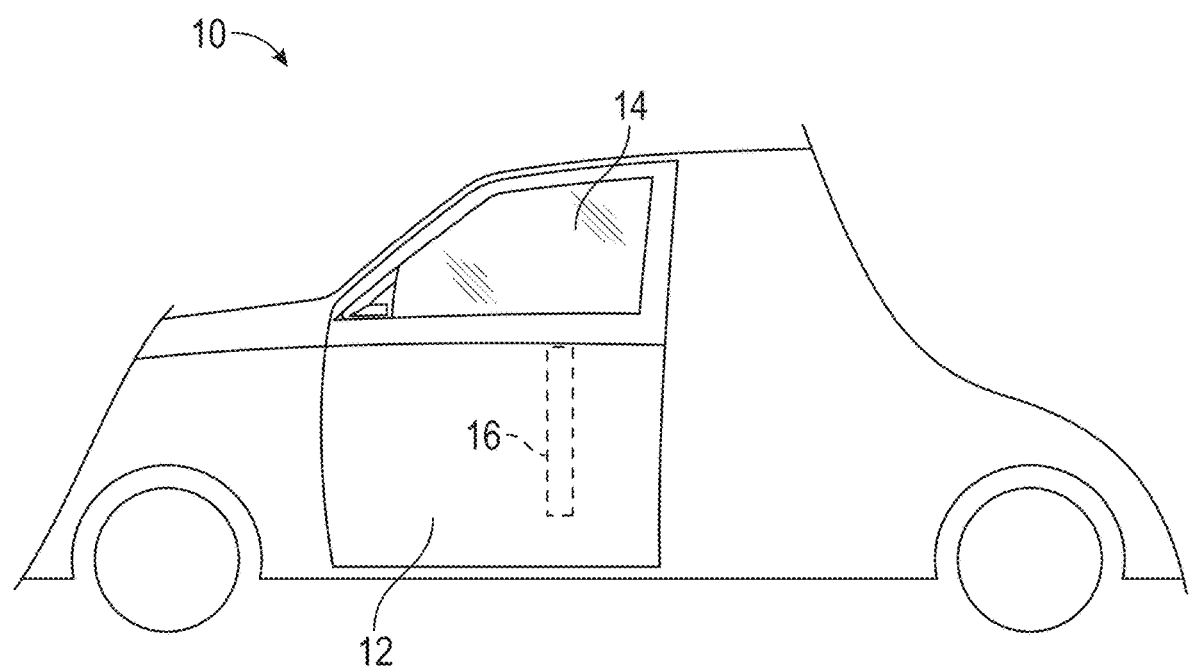
FIG. 1 is a partial view of a vehicle having a window regulator according to the present disclosure.

FIG. 1 is a partial side view of a vehicle 10 having at least one door 12 with a window 14 that is configured to be raised and lowered by a window regulator 16 disposed within door panels (e.g., exterior and interior) of the door 12. Although, only one door 12 and window 14 is illustrated it is contemplated that the window regulator or the present disclosure can be used in a vehicle having numerous doors and associated windows. As such, one or more other windows 14 of the vehicle 10 may also be operated by a window regulator 16 according to the present disclosure.

Figure 2:
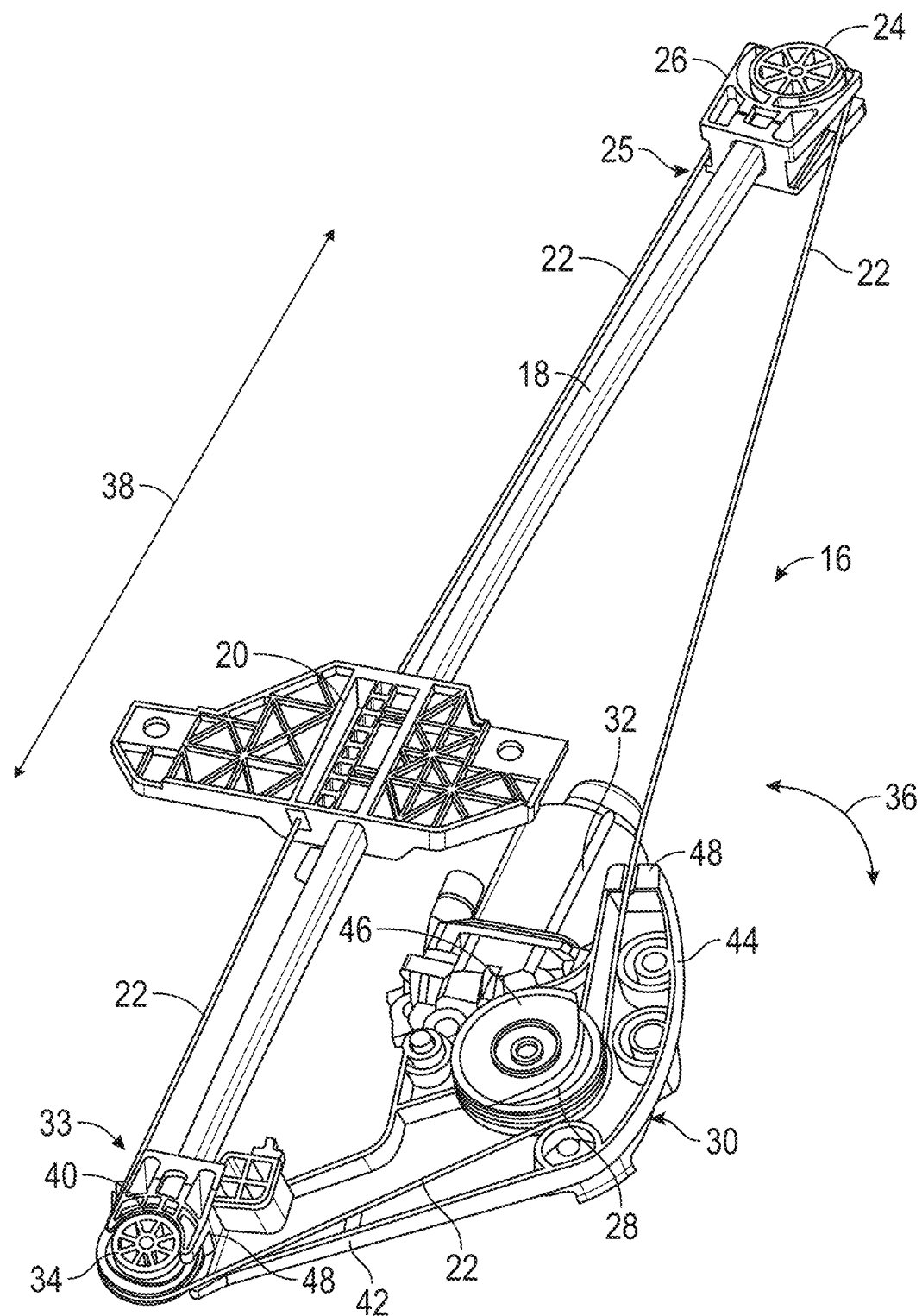
FIG. 2 is a perspective view of a window regulator according to the present disclosure.

FIG. 2 if a perspective view of the window regulator 16. The window regulator 16 includes a guide rail 18 and a cursor 20 that is slidably secured to the guide rail 18. The cursor 20 is configured to be secured to the window 14 and is operably coupled to a cable 22 or cables 22 that are secured to the cursor 20. The window regulator 16 has an upper pulley or upper cam 24 that is secured to a top portion or top end 25 of the guide rail 18 by a housing or feature 26. As illustrated, the upper pulley or upper cam 24 is aligned with the guide rail 18. In the event a pulley is used, the upper pulley 24 is rotationally received in the housing or feature 26. The upper pulley or upper cam is configured to receive either rotationally or slidably cable 22. The cable 22 is secured to the cursor 20 at one end and a cable drum 28 at an opposite end.

The cable drum 28 is rotationally mounted to a housing or flange portion 30. In order to provide rotational movement to the cable drum 28, a motor 32 is operably coupled to the cable drum 28 by for example a worm drive (not shown) that is rotated by the motor 32. The housing or flange portion 30 is secured to a bottom portion or bottom end 33 of the guide rail 18. As used herein, the top end 25 of the guide rail 18 is located closer to a top of the vehicle door 12 than the bottom end 33 when the window regulator 16 is secured to the vehicle door 12.

The housing or flange portion 30 also has a lower pulley or lower cam 34 secured to the housing. In the event a pulley is used, the lower pulley 34 is rotationally received in the housing 30. As illustrated, the lower pulley or lower cam 34 is aligned with the guide rail 18. The lower pulley or lower cam 34 is configured to rotationally or slidably received cable 22.

As mentioned above, a cable 22 or a pair of cables 22 are secured to the cable drum 28 and the cursor 20. In the event, a pair of cables 22 are employed one of the pair of cables 22 is secured to the cursor 20 at one end and the cable drum 28 at the other end and the other one of the cables 22 is secured to the cursor 20 at one end and the cable drum 28 at the other end.

As the cable drum 28 is rotated in the direction of arrows 36 one of the cables 22 (when two are used) will wind up on the cable drum 28 while the other unwinds thus causing movement of the cursor 20 in the directions of arrows 38. Movement of the cursor in the directions of arrows 38 will cause the window 14 to move up and down with respect to the vehicle door 12. In the event a single cable 22 is used a portion of the cable will wind on cable drum 28 while another portion will unwind from the cable drum 28 in order to provide the desired movement of the cursor 20 in the direction of arrows 38.

Figure 3:
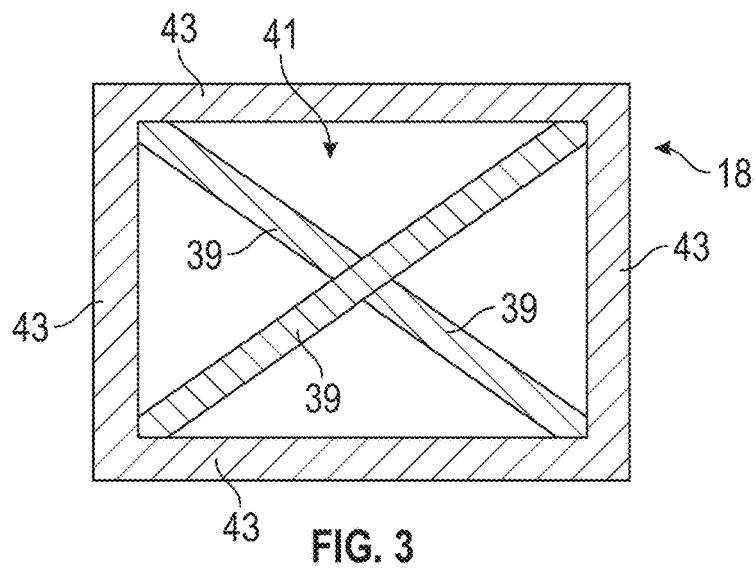
FIG. 3 is a cross sectional view of a guide rail for use with a window regulator according to the present disclosure.

In one non-limiting embodiment, the guide rail 18 is a hollow tube or structure formed from a metal such as aluminum, steel, metallic alloys or the hollow tube formed from a plastic material, or a plastic composite material. In one alternative and as illustrated in at least FIG. 3, the guide rail 18 is an extruded structure that has internal structural features, supports or ribs 39 that extend across a cavity 41 of the guide rail. In this embodiment the internal structural features, supports or ribs 39 extend from an interior surface of the wall or walls that define an exterior surface of the guide rail 18. The exterior surface being opposite to the interior surface of the wall or walls.

In addition and in one non-limiting embodiment, the housing or flange portion 30 and the housing or feature 26 are formed from an easily molded material such as a plastic material, metal insert reinforced plastic or a plastic composite material. Alternatively, the guide rail 18 may be solid. In various embodiments of the present disclosure, the guide rail may have a square or rectangular configuration or periphery.

Not shown are a controller for controlling the motor 32 and inputs to the controller such as user operated switches and a vehicle control module that may also provide input to the controller. Also not shown is an electric power supply system, which may include a battery and alternator as vehicle electric power supply systems and window controllers are well known in the art, these components are not discussed in further detail.

In one embodiment, the cursor 20 or a portion thereof is configured to completely surround a periphery of the guide rail 18. As such, the portion of the cursor 20 surrounding the guide rail 18 will have multiple contact points with the guide rail in order to prevent twisting of the cursor as it slides up and down the guide rail 18 in the direction of arrows 38.

As illustrated in FIG. 2, the housing or flange portion 30 is configured to be mounted to the bottom portion or bottom end 33 of the guide rail 18 and motor 32 is secured to the bottom portion or bottom end 33 of the guide rail 18 via the housing or flange portion 30 as opposed to a bottom mount motor where the motor is mounted to the bottom of the guide rail and the cable drum of the motor assembly is the pulley located at the bottom of the guide rail. Since a bottom mount motor is typically located at the end 33 of the guide rail 18 the motor 32 and its housing may inhibit the movement of the cursor 20 and thus the movement of the window 14.

In accordance with the present disclosure and in order mount the motor 32 to the end 33 of the guide rail 18 the housing or flange portion 30 is configured to have a rail mounting portion 40 that engages the end 33 of the guide rail 18 while an arm portion 42 extends from the rail mounting portion 40 in a direction away from the guide rail 18 such that the motor 32 when mounted to the housing or flange portion 30 is located adjacent to a side of the guide rail 18. As such, when the motor 32 is mounted to the housing or flange portion 30 the motor 32 is located adjacent to a side of the guide rail 18 located between the bottom end 33 of the guide rail 18 and a top end 25 of the guide rail 18. In one embodiment, the arm portion extends laterally and upwardly towards the top end 25 of the guide rail 18 from the bottom end 33 of the guide rail 18.

In one embodiment, the motor 32 can be orientated to extend in a direction generally parallel to the guide rail 18 in order to reduce the required real estate for the window regulator 16 when it is installed in a vehicle door 12. Alternatively, the motor 32 need not be parallel to the guide rail 18 as long as it is located at a side of the guide rail 18 so as to avoid the limited applications of traditional bottom mount motor systems which have limited applications due to glass drop limitations with packaging a motor at the bottom of the rail.

The housing or flange portion 30 also has a mounting portion 44 extending from the arm portion 42. The mounting portion 44 is configured to have the motor 32 mounted thereto and also includes a housing 46 configured to rotationally receive the cable drum 28.

The housing or flange portion 30 may also have cable guides 48 that are configured to guide cable(s) 22 as they are wound and unwound from the cable drum 28.

In one embodiment, the housing or flange portion 30 is formed as a single piece such that the rail mounting portion 40, the arm portion 42, the mounting portion 44 and the housing 46 are all formed together as a single component (e.g., they are all formed as a single piece by for example an injection molding or casing process). As such and when the rail mounting portion 40, the arm portion 42, the mounting portion 44 and the housing 46 or any combination thereof are referred to as being integrally formed it is understood that the housing or flange portion 30 they will be all formed together as a single component (e.g., they are all formed as a single piece).

In yet another alternative embodiment, the guide rail 18 may be a three sided structure with an opening or channel 50 such as a substantially "C" or "U" shaped configuration when viewed from an end or in a cross-sectional view. See for example, FIGS. 4A and 4B wherein the guide rail 18 has a bottom portion 52 with a pair of integrally formed opposing sidewalls 54 that define opening or channel 50. In one alternative embodiment, the pair of integrally formed opposing sidewalls 54 each have a lip portion 56. Alternatively, the pair of integrally formed opposing sidewalls 54 are straight and do not have a lip portion 56. In one embodiment, the guide rail 18 illustrated in FIG. 4A is formed as a single unitary piece that may be formed from a metal such as aluminum, steel, metallic alloys or the guide rail 18 is formed from a plastic material, or a plastic composite material.

Figure 4A:
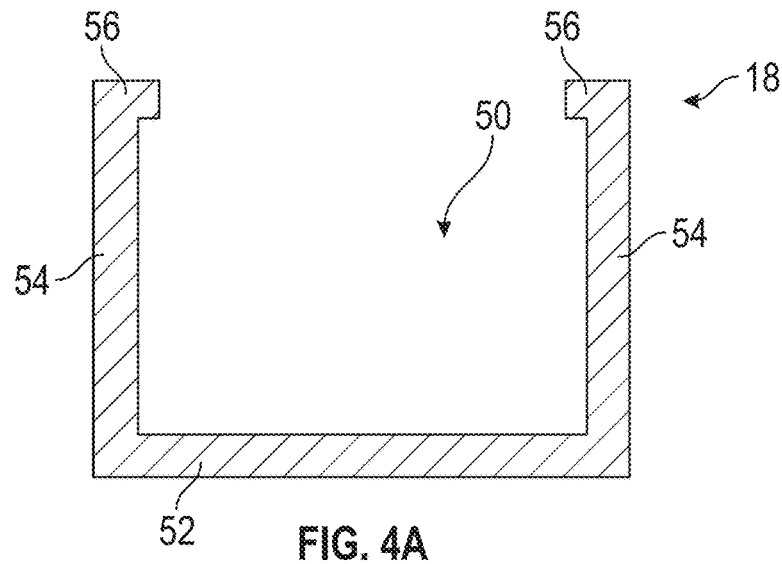
FIGS. 4A and 4B are cross sectional views of a guide rail for use with a window regulator according to the present disclosure.
Figure 4B:
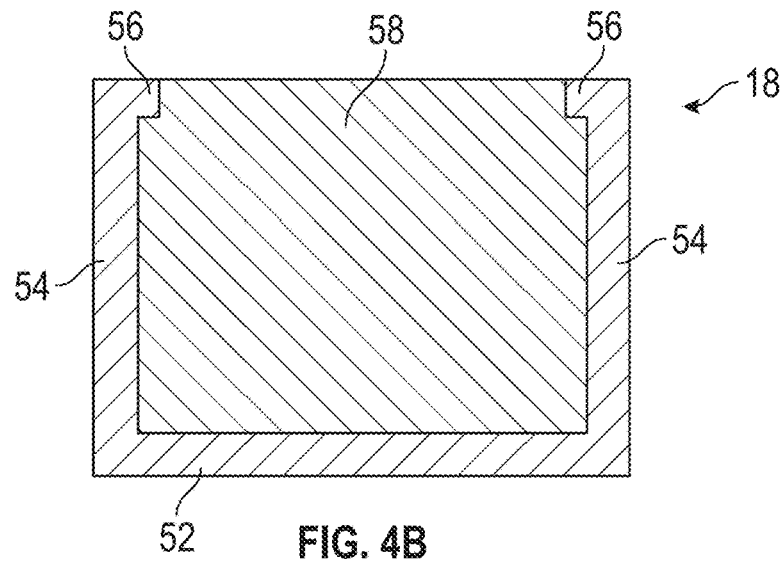
Figure 5E:
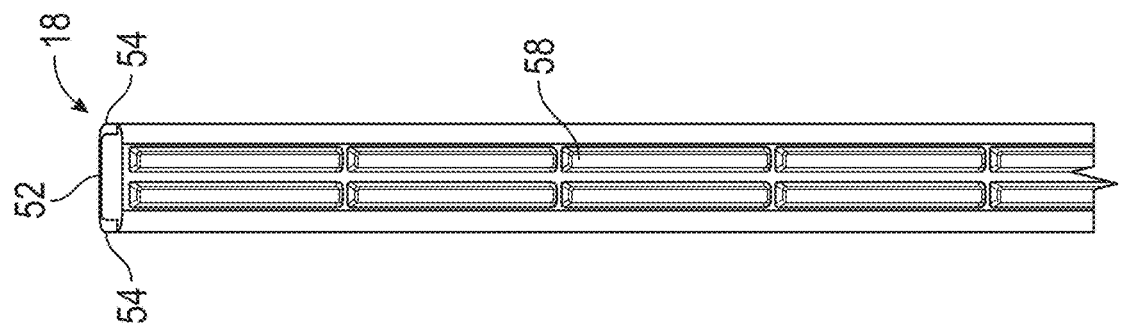
FIGS. 5A-5E illustrate various configurations of a structural member for use with a guide rail in accordance with the present disclosure.
Figure 5D:
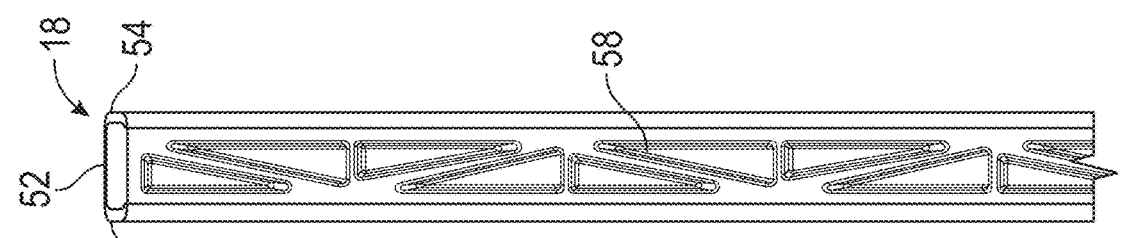
Figure 5C:
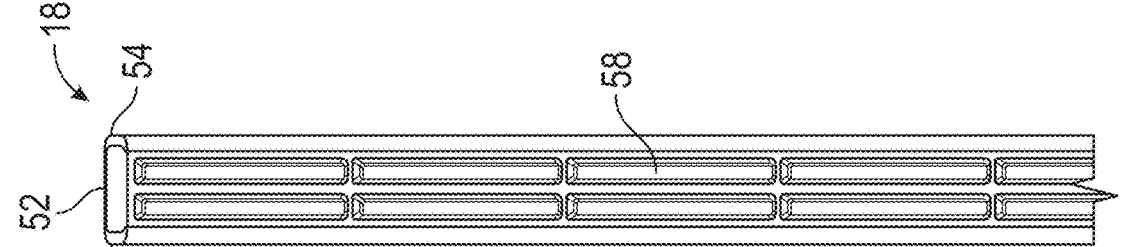
Figure 5B:
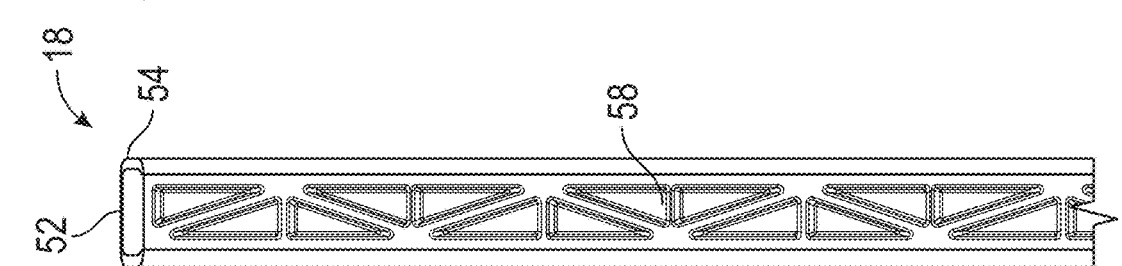
Figure 5A:
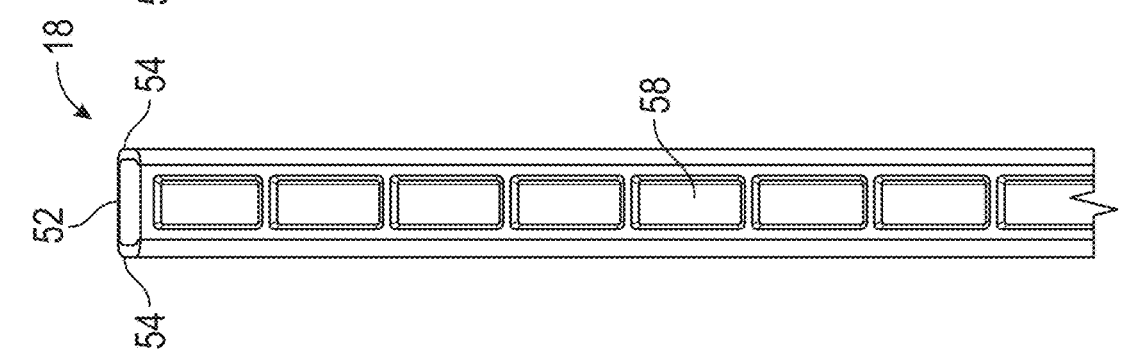
Figure 6B:
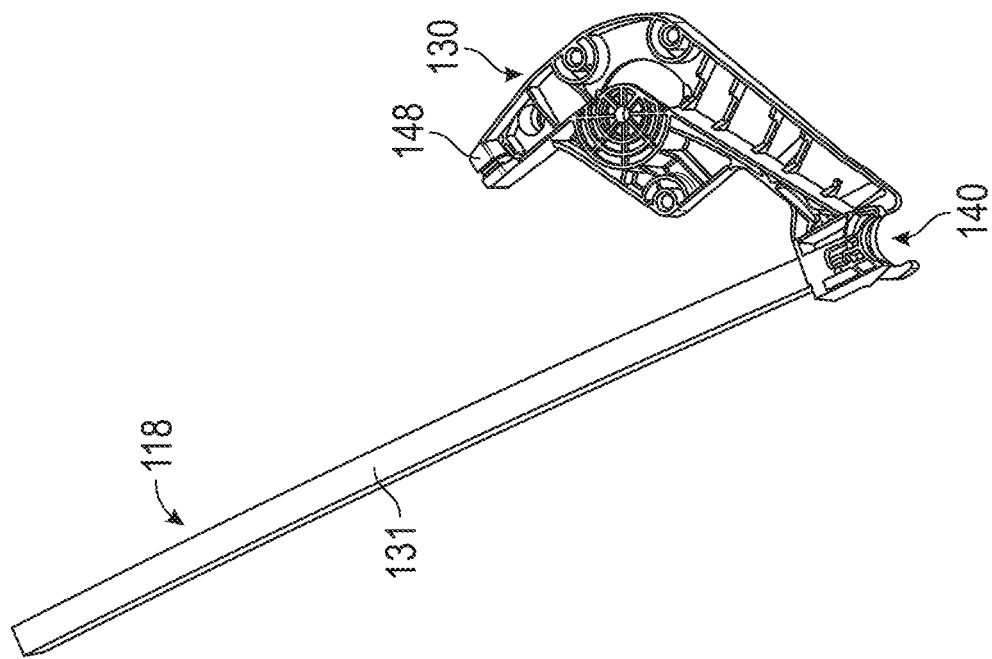
FIGS. 6A and 6B are perspective views of a guide rail with an integral housing or flange portion formed as a single unitary structure.
Figure 6A:
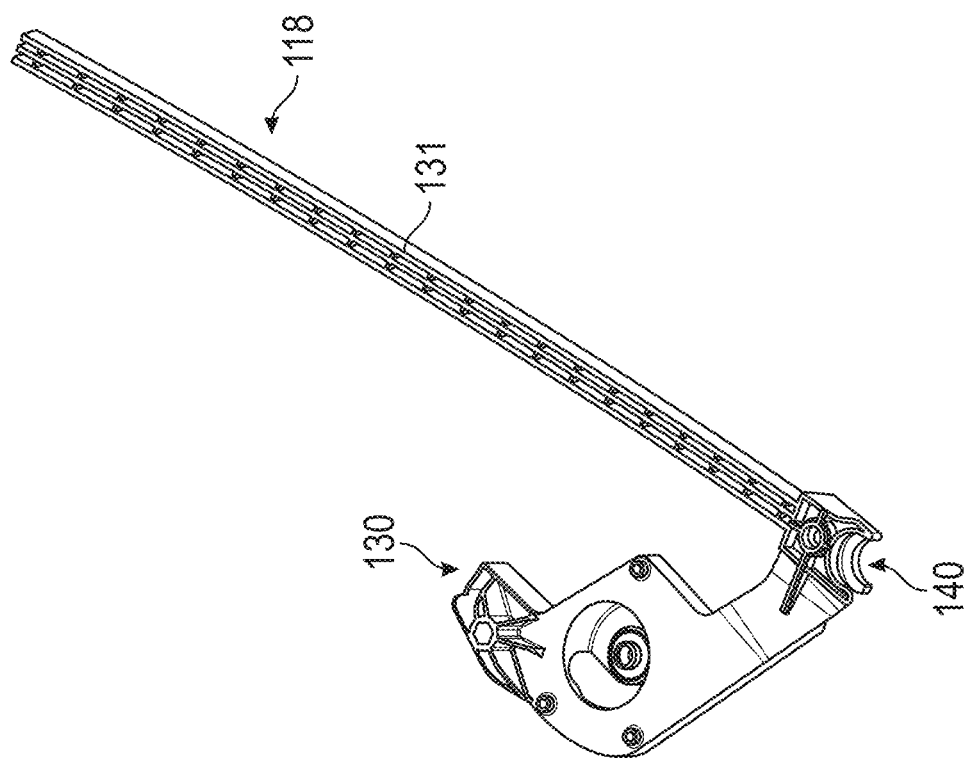
Figure 8:
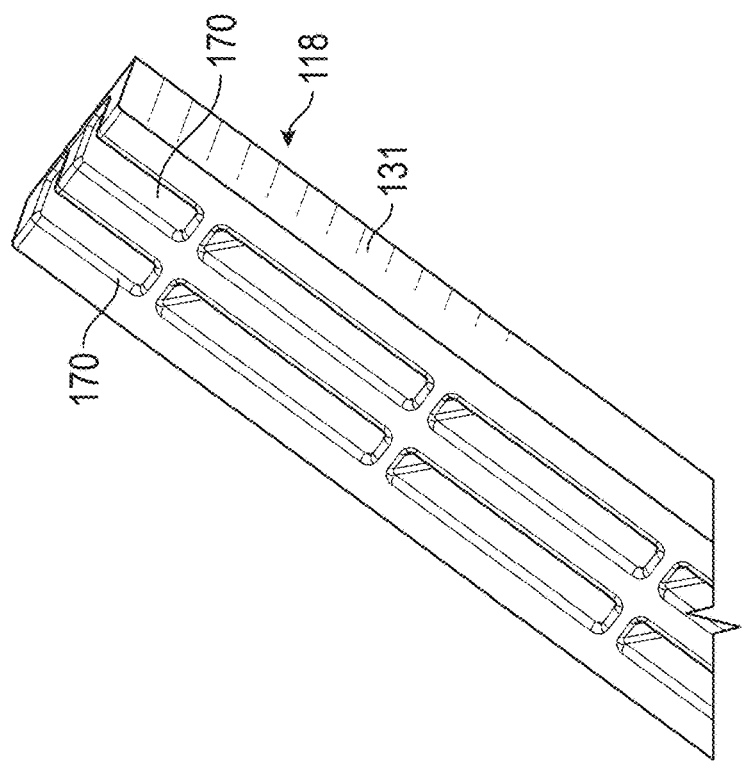
FIG. 8 is a view of a portion of the guide rail illustrated in FIGS. 6A-7B.
Figure 7B:
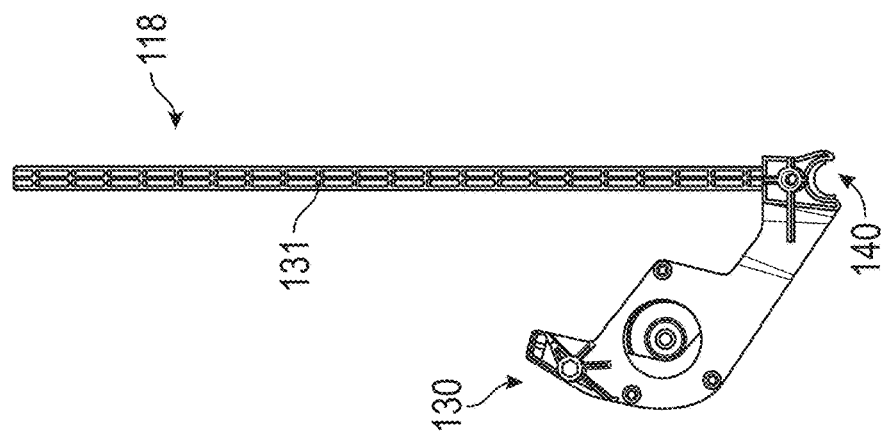
FIGS. 7A and 7B are views of a guide rail with an integral housing or flange portion formed as a single unitary structure.
Figure 7A:
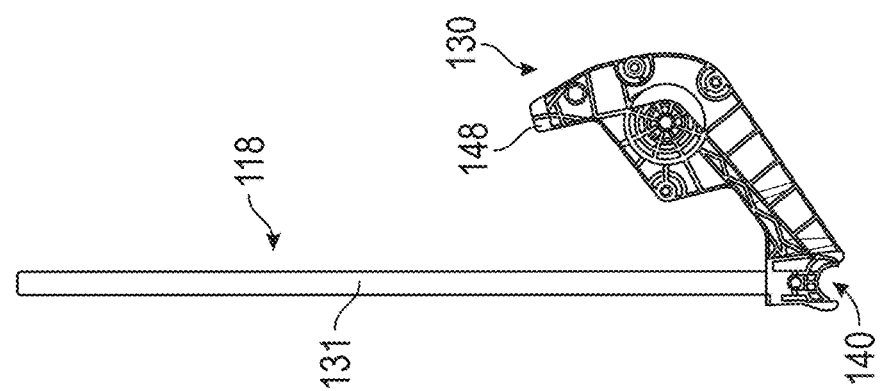
Figure 10:
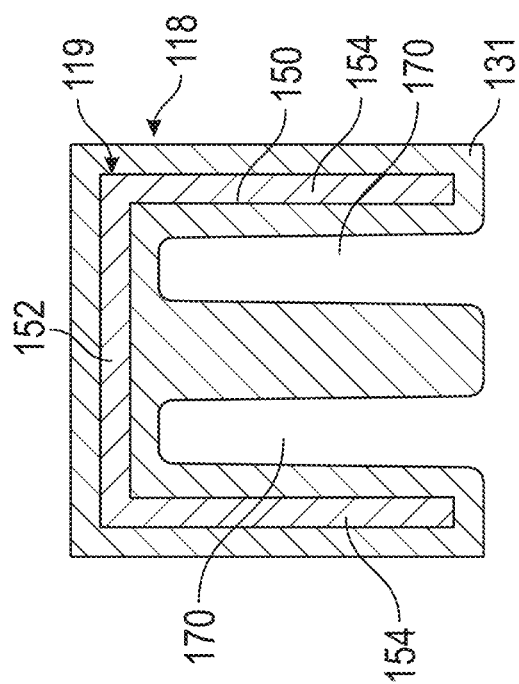
FIG. 10 is a view along lines 10-10 of FIG. 9.
Figure 9:
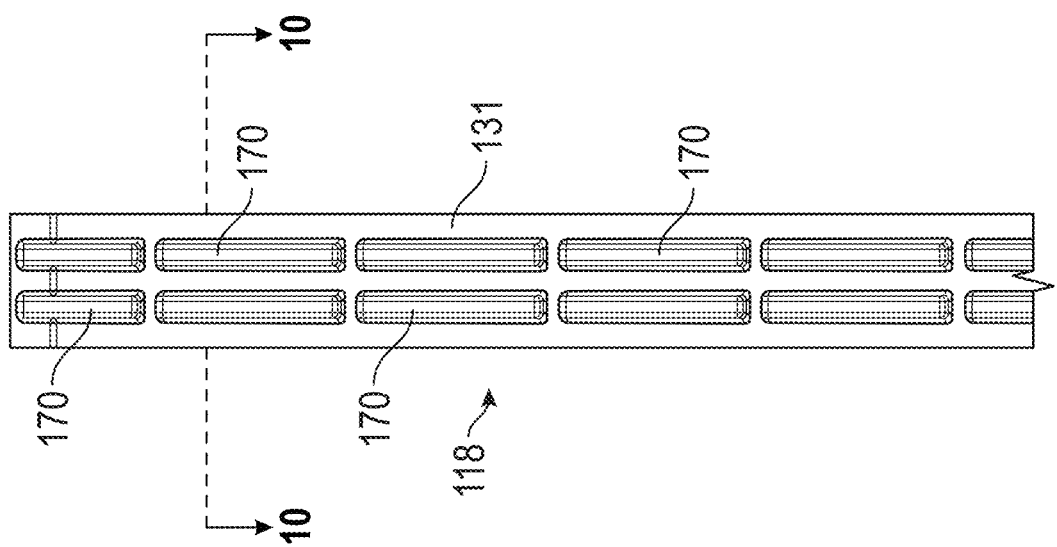
FIG. 9 is a view of a portion of the guide rail illustrated in FIGS. 6A-7B.

In order to provide structural rigidity to the guide rail 18 illustrated in FIG. 4A, the guide rail 18 is insert molded onto or with the housing or flange portion 30 (e.g., the guide rail 18 is inserted into a mold that forms the housing or flange portion 30) and the housing or flange portion 30 has a structural member 58 that extends into cavity 50.

Referring now to FIGS. 5A-5E various configurations of the structural member 58 are illustrated.

In yet another alternative, the guide rail 18 with the structural member 58 is separately formed with an insert molding process and the housing or flange portion 30 is also separately formed and then once formed the housing or flange portion 30 is subsequently secured to the guide rail 18 with the structural member 58.

In the embodiment, where the guide rail 18 is insert molded onto or with the housing or flange portion 30 at least one end of the guide rail 18 has to be open to allow the cursor 20 to be slid on guide rail 18. In one embodiment the housing or flange portion 30 is insert molded onto the guide rail. In this embodiment, the housing or flange portion 30 may include a structural member 58 that is molded into cavity 50 of the guide rail formed as a three sided structure. In yet another alternative, the housing or flange portion 30 may be separately formed and separately secured to the guide rail 18.

In still yet another alternative, the housing or flange portion 30 may be secured to an upper portion of the guide rail (e.g., the portion closest to the window opening in the door when the guide rail 18 is secured to the vehicle door) as opposed to the bottom portion. In this embodiment, the housing or flange portion 30 may employ any of the aforementioned configurations or embodiments (e.g., insert molding with or without structural member 58 and either to a enclosed structure (with or without structural ribs 39) or an open channel structure or to separately formed and secured to the guide rail 18).

When a cursor 20 is used that has a portion that completely surrounds the guide rail 18 and the housing or flange portion 30 is secured to the lower end or upper end of the guide rail 18, the opposite end of the guide rail 18 has to be open so that the cursor 20 can be slid on the guide rail 18 and thereafter a housing or feature 26 is secured to the opposite end (e.g., bottom or top) after the cursor 20 is slid onto the guide rail 18. As mentioned above, the housing or feature 26 is configured to rotationally receive a pulley 24 or is formed to have a cam feature 24 for guiding the cable 22 therethrough.

Alternatively and in some of the aforementioned embodiments the cursor 20 may be only configured to ride or slide on three sides of the guide rail. In these embodiments, the cursor 20 can be snap fitted onto the guide rail 18. As such, there may be no need to leave one of the ends of the guide rail 18 open. This is particularly advantageous in the embodiments where the structural member 58 is insert molded into the guide rail 10.

Referring now to FIGS. 6A-10 yet another alternative embodiment of the present disclosure is illustrated. Here the guide rail 118 for use with a motor, cables, cursor, pulleys and associated components in order to provide a window regulator is formed as single unitary structure with the a housing or flange portion 130. The housing or flange portion 130 is configured to support a motor and associated cable drum such that the motor is located at a side of the guide rail 118. The housing or flange portion 130 may also be configured to have a cable guide(s) 148 that are configured to guide cable(s) as they are wound and unwound from the cable drum 28.

In this embodiment a three sided structural member 119 having an opening or channel 150 such as a substantially "C" or "U" shaped configuration when viewed from an end or in a cross-sectional view is insert molded with an exterior plastic material 131 such that when completely formed by the insert molding process the exterior plastic material 131 forms an exterior surface of the guide rail 118 upon which the cursor will slide. The three sided structural member 119 may have a bottom portion 152 with a pair of integrally formed opposing sidewalls 154 that define opening or channel 150. The three sided structural member 119 may be formed from a metal such as aluminum, steel, metallic alloys or from a plastic material, or a plastic composite material that is capable of being insert molded.

As such, the three sided structural member 119 can provide additional structural reinforcement and rigidity to the guide rail 118.

In one non-limiting embodiment, the exterior plastic material located within opening or channel 150 may have open areas 170 to reduce the required material for the exterior plastic material 131.

In FIGS. 6A, 6B, 7A and 7B it is understood that the housing or flange portion 130 may be located at either the top or bottom of the guide rail 118 when it is secured to the vehicle door 12. Also illustrated is a feature 140 that is configured to rotationally receive a pulley.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A window regulator for raising and lowering a window of a vehicle, comprising:
   a guide rail;
   a cursor slidably mounted to the guide rail;
   a flange portion only mounted to a bottom end of the guide rail, by a rail mounting portion of the flange portion, and an arm portion and a mounting portion extend from the rail mounting portion, the mounting portion terminating at a distal end of the mounting portion that is spaced from a top end of the guide rail, the arm portion and the mounting portion do not directly contact the guide rail; and
   a motor operably coupled to the cursor such that operation of the motor will cause the cursor to slide along the guide rail, the motor being mounted to the mounting portion, wherein the motor when mounted to the mounting portion is located adjacent to a side of the guide rail located between the bottom end of the guide rail and the top end of the guide rail and the cursor being capable of sliding along a portion of the guide rail that is adjacent to the arm portion and the mounting portion such that a portion of the cursor can be located between the guide rail and the mounting portion and at least a portion of the arm portion.

2. The window regulator as in claim 1, further comprising a cable drum rotationally mounted to the flange portion, the cable drum being operably coupled to the motor and at least one cable secured to the cable drum at one end and the cursor at another end.

3. The window regulator as in claim 1, further comprising a lower pulley rotationally mounted to the rail mounting portion and an upper pulley rotationally secured to secured to the top end of the guide rail by a housing.

4. The window regulator as in claim 1, wherein the guide rail is a three sided structure with an opening and the guide rail is insert molded onto the flange portion the flange portion has a structural member that extends into the opening.

5. The window regulator as in claim 1, wherein the guide rail is an extruded structure that has internal structural features that extend across a cavity of the guide rail.

6. The window regulator as in claim 1, wherein the guide rail has a rectangular periphery and a portion of the cursor completely surrounds the guide rail.

7. The window regulator as in claim 6, wherein the guide rail is hollow.

8. The window regulator as in claim 6, wherein the portion of the cursor surrounding the guide rail has multiple contact points with the guide rail in order to prevent twisting of the cursor as the cursor slides up and down the guide rail.

9. The window regulator as in claim 1, wherein the rail mounting portion, the arm portion extending and the mounting portion are all formed as a single piece.

10. The window regulator as in claim 1, wherein the motor extends in a direction generally parallel to the guide rail.

11. The window regulator as in claim 1, wherein a pair of cables are secured to a cable drum rotationally mounted to the flange portion at one end and the cursor at another end.

12. The window regulator as in claim 11, wherein the flange portion further comprises cable guides configured to guide the pair of cables as they are wound and unwound from the cable drum.

13. The window regulator as in claim 1, wherein the arm portion extends laterally and upwardly towards the top end of the guide rail from the bottom end of the guide rail.

14. A window regulator for raising and lowering a window of a vehicle, comprising:
a guide rail;
a cursor slidably mounted to the guide rail;
a flange portion only mounted to a top end of the guide rail, by a rail mounting portion of the flange portion, and an arm portion and a mounting portion extend from the rail mounting portion, the mounting portion terminating at a distal end of the mounting portion that is spaced from a bottom end of the guide rail, the arm portion and the mounting portion do not directly contact the guide rail; and
a motor operably coupled to the cursor such that operation of the motor will cause the cursor to slide along the guide rail, the motor being mounted to the mounting portion, wherein the motor when mounted to the mounting portion is located adjacent to a side of the guide rail located between the bottom end of the guide rail and the top end of the guide rail and the cursor being capable of sliding along a portion of the guide rail that is adjacent to the arm portion and the mounting portion such that a portion of the cursor can be located between the guide rail and the mounting portion and at least a portion of the arm portion.

15. A window regulator for raising and lowering a window of a vehicle, comprising:
a guide rail;
a cursor slidably mounted to the guide rail;
a flange portion only mounted to a bottom end of the guide rail, by a rail mounting portion of the flange, and an arm portion and a mounting portion extend from the rail mounting portion, the mounting portion terminating at a distal end of the mounting portion that is spaced from a top end of the guide rail, the arm portion and the mounting portion do not directly contact the guide rail; and
a motor operably coupled to the cursor by at least one cable such that operation of the motor will cause the cursor to slide along the guide rail, the motor being mounted to the mounting portion, wherein the motor when mounted to the mounting portion is located adjacent to a side of the guide rail located between the bottom end of the guide rail and the top end of the guide rail and the cursor being capable of sliding along a portion of the guide rail that is adjacent to the arm portion and the mounting portion such that a portion of the cursor can be located between the guide rail and the mounting portion and at least a portion of the arm portion.

16. The window regulator as in claim 15, further comprising a lower pulley rotationally mounted to the rail mounting portion and an upper pulley rotationally secured to secured to the top end of the guide rail by a housing.

17. The window regulator as in claim 16, further comprising a cable drum rotationally mounted to the flange portion, the cable drum being operably coupled to the motor and the at least one cable being wound and unwound from the cable drum as cable drum is rotated by the motor.

18. The window regulator as in claim 17, wherein the guide rail has a rectangular periphery and a portion of the cursor completely surrounds the guide rail.

19. The window regulator as in claim 18, wherein the guide rail is hollow.

20. The window regulator as in claim 18, wherein the portion of the cursor surrounding the guide rail has multiple contact points with the guide rail in order to prevent twisting of the cursor as the cursor slides up and down the guide rail.

* * * * *